United States Patent
McClure et al.

(10) Patent No.: US 9,864,609 B1
(45) Date of Patent: Jan. 9, 2018

(54) REBOOTING A HYPERVISOR WITHOUT DISRUPTING OR MOVING AN ASSOCIATED GUEST OPERATING SYSTEM

(71) Applicant: EMC Corporation, Hopkinton, MA (US)

(72) Inventors: Steven McClure, Northboro, MA (US); Jonathan I. Krasner, North Attleboro, MA (US); Serge J. Pirotte, Coventry, RI (US); Velmurugan Rathnam, Shrewsbury, MA (US); Steven R. Chalmer, Auburndale, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 854 days.

(21) Appl. No.: 13/916,859

(22) Filed: Jun. 13, 2013

(51) Int. Cl.
  *G06F 9/46*  (2006.01)
  *G06F 9/44*  (2006.01)
  *G06F 9/455* (2006.01)

(52) U.S. Cl.
  CPC .......... *G06F 9/4418* (2013.01); *G06F 9/455* (2013.01); *G06F 9/45533* (2013.01)

(58) Field of Classification Search
  CPC ..... G06F 9/4418; G06F 9/455; G06F 9/45533
  See application file for complete search history.

(56) References Cited

U.S. PATENT DOCUMENTS

| | | | |
|---|---|---|---|
| 2004/0064673 A1* | 4/2004 | Rogers | G06F 12/10 711/207 |
| 2006/0136667 A1* | 6/2006 | Shultz et al. | 711/118 |
| 2006/0161921 A1* | 7/2006 | Kissell | 718/102 |
| 2009/0007100 A1* | 1/2009 | Field | G06F 21/53 718/1 |
| 2011/0202917 A1* | 8/2011 | Laor | G06F 8/65 718/1 |
| 2012/0096252 A1* | 4/2012 | Arditti | G06F 8/67 713/2 |
| 2014/0053150 A1* | 2/2014 | Barnett | G06F 9/455 718/1 |
| 2014/0157264 A1* | 6/2014 | Russinovich et al. | 718/1 |
| 2014/0244877 A1* | 8/2014 | Williamson | G06F 13/24 710/262 |
| 2014/0366019 A1* | 12/2014 | Bajaj | G06F 9/461 718/1 |

* cited by examiner

*Primary Examiner* — James J Lee
(74) *Attorney, Agent, or Firm* — Anderson Gorecki LLP

(57) ABSTRACT

A non-disruptive, non-migratory hypervisor reboot is performed by suspending execution of the guest operating system, rebooting the container, and then resuming execution of the guest operating system. Suspending execution of the guest operating system can include stopping guest OS access to processing resources. Reboot includes the container loading or reloading itself while preserving the contents of the volatile memory in place. It is also possible to relocate some or all of the contents of the volatile memory to different addresses by creating an abstraction layer.

15 Claims, 4 Drawing Sheets

REBOOTING A HYPERVISOR WITHOUT DISRUPTING OR MOVING AN ASSOCIATED GUEST OPERATING SYSTEM

CROSS-REFERENCE TO RELATED APPLICATIONS

N/A

BACKGROUND OF THE INVENTION

Aspects of the invention are generally related to data storage, and more particularly to program code such as a hypervisor which supports virtual hosts associated with a data storage subsystem. Enterprise and service provider data storage systems are used to maintain relatively large data sets. A simple data storage subsystem includes a storage array and one or more hosts. Applications Read and Write data by sending JO requests to hosts. The hosts translate the JO requests from a format characterized by designators used by applications, e.g., filename, into a format characterized by designators used by the storage array, e.g., LUN, cylinder and track, in order to prompt a Read or Write in accordance with the JO requests. Clusters of data storage subsystems can be organized into a data center. Groups of data centers can be organized into a single enterprise or service provider data storage system.

It is known to implement multiple virtual hosts on a single physical hardware platform such as a line card or server. A computer program such as a hypervisor manages sharing of the resources of the hardware platform among the virtual hosts. In particular, the hypervisor manages operation of guest operating systems which are associated with the virtual hosts by sharing processing and memory resources such that, from the perspective of each guest operating system, the resources appear to be dedicated to that guest operating system. Consequently, individual hardware platforms need not be dedicated to individual hosts, and a variety of virtual hosts may be supported by a physical host device.

One drawback to virtual hosts is that a hypervisor reboot can be particularly disruptive. Unlike a reboot of a non-virtualized physical host device, reboot of a virtualized host platform tends to disrupt multiple guest operating systems. In the case of a planned reboot, storage administrators typically shut down the guest operating systems or migrate those guest operating systems to another hypervisor located on another server before rebooting the hypervisor, e.g., before upgrading the hypervisor code. Consequently, the advantages of supporting multiple virtual hosts on a single hardware platform lead to disadvantages when a reboot is performed.

SUMMARY OF THE INVENTION

In accordance with an aspect of the invention, a method comprises: on a hardware platform in which a plurality of guest operating systems and a plurality of containers are implemented, each container being associated with one the guest operating systems and managing access of the associated guest operating system to processing resources and volatile memory of the hardware platform, performing a reboot by suspending operation of ones of the guest operating systems, rebooting ones of the containers while preserving at least some contents of the volatile memory, and resuming operation of the suspended guest operating systems.

In accordance with another aspect of the invention, a computer program stored on a non-transitory computer-readable medium comprises: on a hardware platform in which a plurality of guest operating systems and a plurality of containers are implemented, each container being associated with one the guest operating systems and including logic which manages access of the associated guest operating system to processing resources and volatile memory of the hardware platform, logic which performs a reboot by suspending operation of ones of the guest operating systems, logic which reboots ones of the containers while preserving at least some contents of the volatile memory, and logic which resumes operation of the suspended guest operating systems.

In accordance with another aspect of the invention, an apparatus comprises: on a hardware platform in which a plurality of guest operating systems and a plurality of containers are implemented, each container being associated with one the guest operating systems and including logic stored in volatile memory which manages access of the associated guest operating system to processing resources and the volatile memory of the hardware platform, reboot logic stored in non-transitory computer-readable memory which performs a reboot by suspending operation of ones of the guest operating systems, reboots ones of the containers while preserving at least some contents of the volatile memory, and resumes operation of the suspended guest operating systems.

Advantages associated with aspects of the invention include a non-disruptive, non-migratory hypervisor reboot which is transparent to the associated guest operating systems. Suspending execution of the guest operating system and maintaining at least some of the contents of the volatile memory at the same addresses helps to enable the reboot to be performed without disrupting or migrating the guest operating system. For example, state information associated with the guest operating system may be maintained. Further, that state information is present at the same address following reboot so the guest operating system can quickly resume operation after the reboot. Consequently, if the reboot process can be completed within a brief period of time, e.g., on the order of milliseconds, it will be transparent to the guest operating system.

Another advantage is a non-disruptive, non-migratory hypervisor reboot which includes relocating some or all of the contents of the volatile memory to different addresses. An abstraction layer can be created between the suspended guest operating system and the volatile memory such that an address translation associates the original addresses with new addresses. Hence, from the perspective of the guest operating system, the contents of the volatile memory will not have changed after resumption of execution even though those contents will actually have been relocated in association with the reboot.

Other features and advantages will become apparent in view of the figures and detailed description.

DETAILED DESCRIPTION

Various aspects of the invention may be implemented partially or completely in software using computer program code. The computer program code is stored on non-transitory computer-readable memory and utilized by processing hardware to implement instructions corresponding to certain steps. The program code may be provided as a computer program product or be integrated into network storage equipment. All of the illustrated devices may include processing hardware and non-transitory storage media capable of storing and implementing computer program code.

Figure 1:
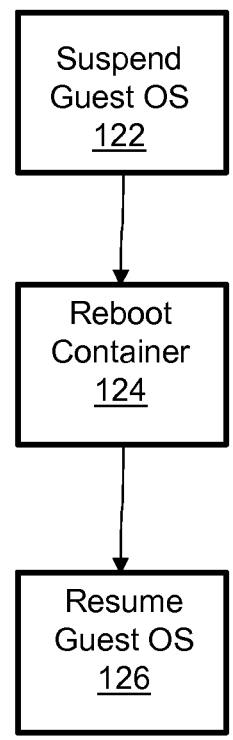
FIG. 1 illustrates a non-disruptive, non-migratory hypervisor reboot.
Figure 2:
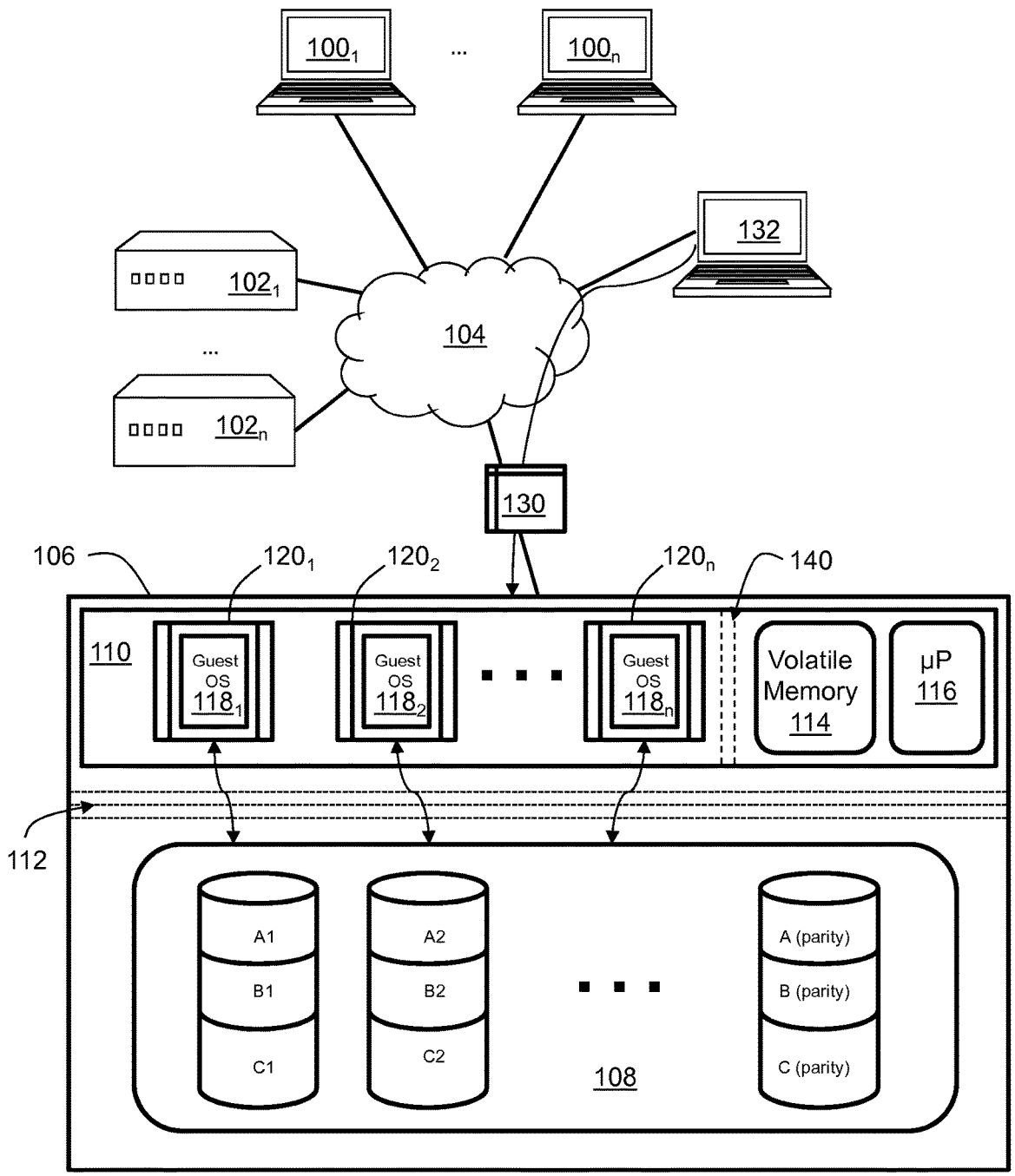
FIG. 2 illustrates a data storage subsystem in a simplified network environment.

Referring to FIGS. 1 and 2, a non-disruptive, non-migratory hypervisor reboot can be performed in accordance with an aspect illustrated with reference to a simplified network environment in which applications running on devices such as user terminals $100_1$ through $100_n$ (including but not limited to personal computing devices of any kind) and servers $102_1$ through $102_n$ (including but not limited to computing devices of any kind which perform tasks for other devices) utilize data maintained by a data storage subsystem 106 via a network 104. The data storage subsystem 106, e.g., the Symmetrix system of EMC corporation, may include a storage array 108 and one or more physical host devices 110 (only one shown for simplicity), e.g., line cards. The storage array 108 includes physical storage devices which may be organized as a RAID group characterized by striping, parity, or both. Various abstraction layers 112 may be presented between the hosts 110 and the storage array 108. For example, data storage space on physical devices may be organized into virtual volumes. Moreover, the storage array may be tiered, thinly provisioned, and otherwise organized in accordance with any of a wide variety of techniques.

Each physical host device 110 includes volatile memory resources 114 and processing resources 116. Examples of volatile memory resources 114 include but are not limited to random access memory (RAM), such as dynamic RAM (DRAM).

Examples of processing resources 116 include but are not limited to physical processors and individual cores thereof. Hypervisor code, which may be maintained in the volatile memory, manages sharing of the volatile memory resources and processing resources between multiple guest operating systems $118_1$-$118_n$. In particular, a set of corresponding container instances $120_1$-$120_n$ is provided, one container per guest operating system, where the set of containers comprise the hypervisor. Each container manages, for its associated guest operating system, access to the volatile memory resources and processing resources. Each guest operating system may be allocated an amount of space in the volatile memory 114, e.g., a segment defined by a range of addresses. Execution of threads associated with different guest operating systems is performed by the processing resources 116 in accordance with scheduling algorithms. From the perspective of an individual container, a non-disruptive, non-migratory hypervisor reboot can be made transparent to the associated guest operating system via the steps of suspending execution of the guest operating system 122, rebooting the container 124, and then resuming execution of the guest operating system 126.

Figure 3:
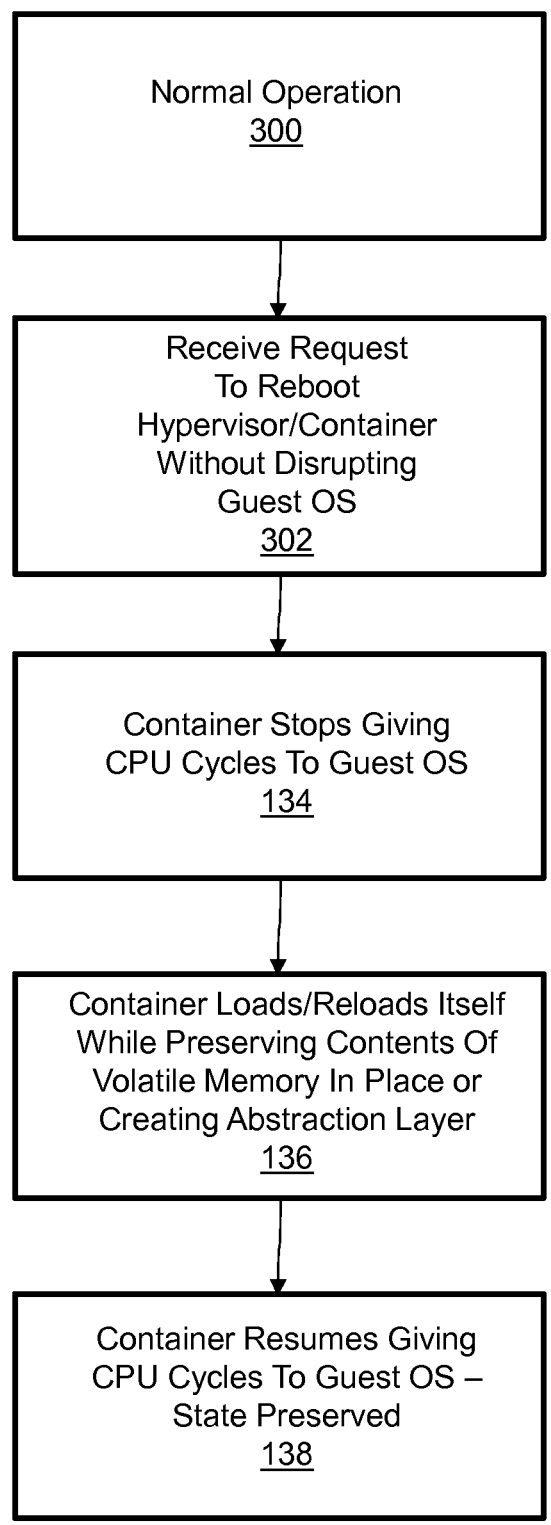
FIG. 3 illustrates a non-disruptive, non-migratory hypervisor reboot in greater detail.

FIG. 3 illustrates aspects of the non-disruptive, non-migratory hypervisor reboot in greater detail. Commencing from normal operation 300 in which the storage subsystem is online and the guest operating systems are running in the associated containers, the reboot procedure is prompted when the storage subsystem receives a communication 130 (FIG. 2) including a request to reboot the hypervisor/container without disrupting the guest operating system as shown in step 302. The communication may be sent from a remote management station 132 (FIG. 2) via the network. In response to the request each container stops giving CPU cycles (access to the processing resources) to the associated guest operating system as indicated in step 134 in order to suspend operation of the associated guest operating system. The container then loads or reloads itself while preserving the contents of the volatile memory in place as indicated in step 136. More particularly, upgraded code, which may be included in the communication, may be copied over the existing code, or the existing code may be reloaded at the same memory space. In either case the contents of the volatile memory are maintained, i.e., at the same addresses, although it will be appreciated that upgraded code may occupy a substantially similar address space as the existing code due, for example, to differences in size between the existing and upgraded code. However, state information associated with the guest operating system is maintained in place. The container then resumes operation, including giving CPU cycles to the guest operating system, as indicated by step 138.

Maintaining some or all of the contents of the volatile memory at the same addresses helps to enable the reboot to be performed without disrupting or migrating the guest operating system. For example, maintaining state information associated with the guest operating system at the same address following reboot helps enable the guest operating system to resume normal operation. Consequently, if the reboot process can be completed within a brief period of time, e.g., on the order of milliseconds, it will be transparent to the guest operating system.

It is also possible to relocate some or all of the contents of the volatile memory to different addresses without disrupting or migrating the guest operating system. For example, an abstraction layer 140 (FIG. 2) can be created between the guest operating system and the volatile memory such that an address translation associates the original addresses with new addresses as indicated in step 136. For example, page tables or an equivalent technique might be utilized. Hence, from the perspective of the guest operating system the contents of the volatile memory will not have changed even though those contents will actually have been relocated in association with the reboot.

Figure 4:
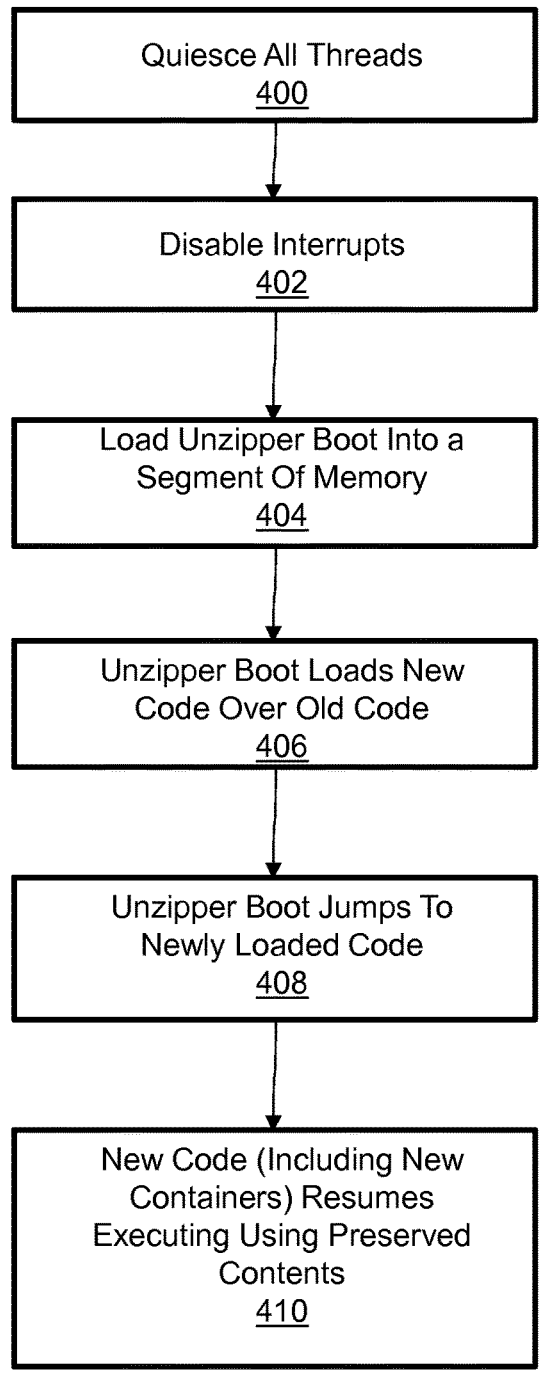
FIG. 4 illustrates aspects of loading updated hypervisor code in greater detail.

FIG. 4 illustrates further aspects of a hypervisor update. Suspending the guest operating system in preparation for the update includes quiescing all threads and disabling interrupts as indicated by steps 400 and 402. In particular, threads associated with various different guest operating systems are quiesced. Unzipper boot code provided by the remote management station is loaded into a segment of memory as indicated by step 404. Unzipper boot then loads the new code over the existing code in memory as indicated by step 406. The unzipper boot jumps to the newly loaded code, e.g., sets a pointer to begin operation, as indicated by step 408. The new hypervisor code, including the new containers, then resumes executing using the preserved contents of volatile memory as indicated by step 410, thereby avoiding disruption and migration of the associated guest operating system.

While the invention is described through the above exemplary embodiments, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Moreover, various features, aspects and embodiments may be combined in any of various ways without departing from the inventive concepts herein disclosed. Accordingly, the invention should not be viewed as limited except by the scope and spirit of the appended claims.

What is claimed is:

1. A method comprising:
on a hardware platform in which a plurality of guest operating systems and a plurality of containers are implemented, each container being associated with one of the guest operating systems and managing access of the associated guest operating system to processing resources and volatile memory of the hardware platform, suspending operation of the guest operating systems, after suspending operation of the guest operating systems and before rebooting the containers, loading new container code over existing container code of the containers in the volatile memory, rebooting the containers while preserving at least some contents of the volatile memory, and resuming operation of the suspended guest operating systems.

2. The method of claim 1 including preserving the at least some contents of the volatile memory at existing memory locations.

3. The method of claim 1 including creating an abstraction layer such that an address translation associates existing memory locations of the at least some contents of the volatile memory with new memory locations of the at least some contents of the volatile memory.

4. The method of claim 1 wherein suspending operation of ones of the guest operating systems includes each container stopping access of the associated guest operating system to the processing resources.

5. The method of claim 1 wherein suspending operation of ones of the guest operating systems includes quiescing all threads of the guest operating systems.

6. A computer program stored on non-transitory computer-readable media, comprising:
on a hardware platform in which a plurality of guest operating systems and a plurality of containers are implemented, each container being associated with one of the guest operating systems and including logic which manages access of the associated guest operating system to processing resources and volatile memory of the hardware platform, logic which suspends operation of the guest operating systems, logic which, after operation of the guest operating systems is suspended and before the containers are rebooted, loads new container code over existing container code of the containers in the volatile memory, logic which reboots the containers while preserving at least some contents of the volatile memory, and logic which resumes operation of the suspended guest operating systems.

7. The computer program of claim 6 including preserving the at least some contents of the volatile memory at existing memory locations.

8. The computer program of claim 6 including logic which creates an abstraction layer such that an address translation associates existing memory locations of the at least some contents of the volatile memory with new memory locations of the at least some contents of the volatile memory.

9. The computer program of claim 6 wherein the logic which suspends operation of ones of the guest operating systems includes logic which stops access of the guest operating systems to the processing resources.

10. The computer program of claim 6 wherein the logic which suspends operation of ones of the guest operating systems includes logic which quiesces all threads of the guest operating systems.

11. Apparatus comprising:
on a hardware platform in which a plurality of guest operating systems and a plurality of containers are implemented, each container being associated with one of the guest operating systems and including logic stored in volatile memory which manages access of the associated guest operating system to processing resources and the volatile memory of the hardware platform, reboot logic stored in non-transitory computer-readable memory which suspends operation of the guest operating systems, after suspending operation of the guest operating systems and before rebooting the containers, loads new container code over existing container code of the containers in the volatile memory, reboots the containers while preserving at least some contents of the volatile memory, and resumes operation of the suspended guest operating systems.

12. The apparatus of claim 11 wherein the reboot logic preserves the at least some contents of the volatile memory at existing memory locations.

13. The apparatus of claim 11 wherein the reboot logic creates an abstraction layer such that an address translation associates existing memory locations of the at least some contents of the volatile memory with new memory locations of the at least some contents of the volatile memory.

14. The apparatus of claim 11 wherein the reboot logic stops access of the guest operating systems to the processing resources.

15. The apparatus of claim 11 wherein the reboot logic quiesces all threads of the guest operating systems.

* * * * *